Nov. 11, 1941. H. W. MACKEY 2,262,644
WINDOW ASSEMBLY
Filed March 11, 1940 3 Sheets-Sheet 1
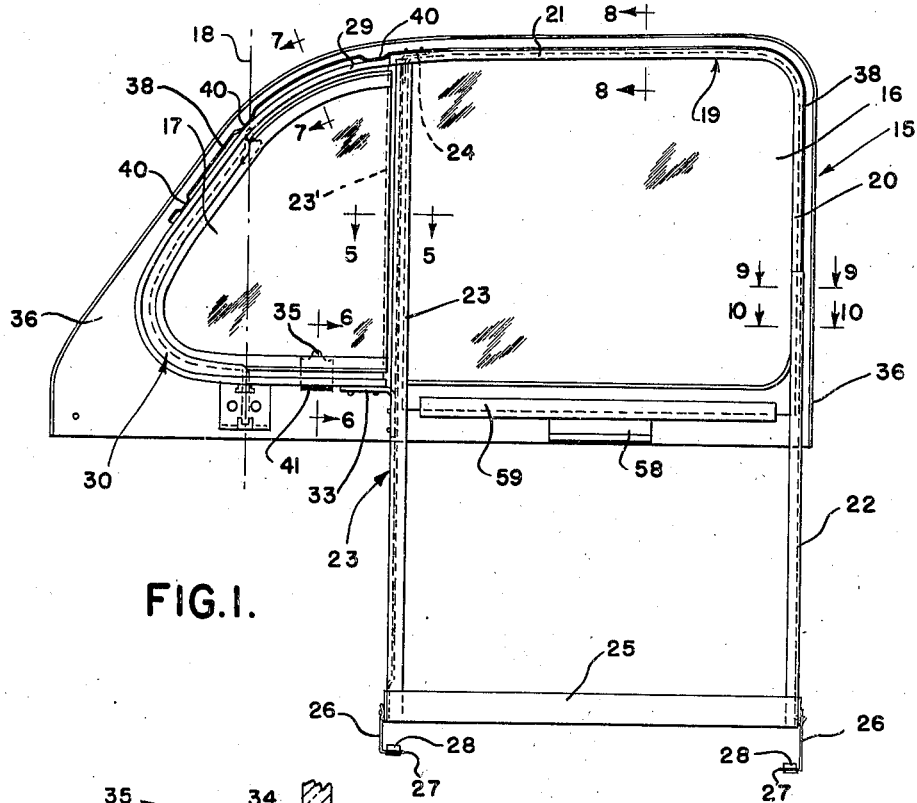
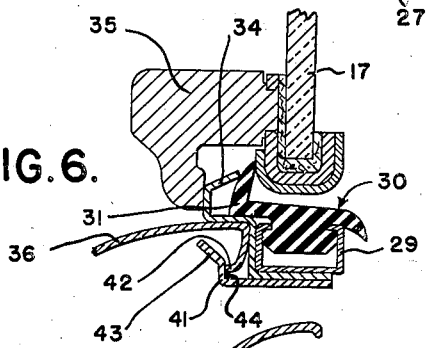
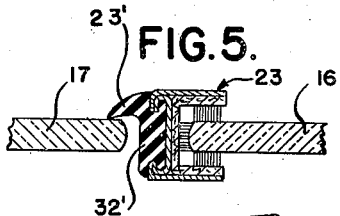
INVENTOR.
HENRY W. MACKEY
BY
ATTORNEYS

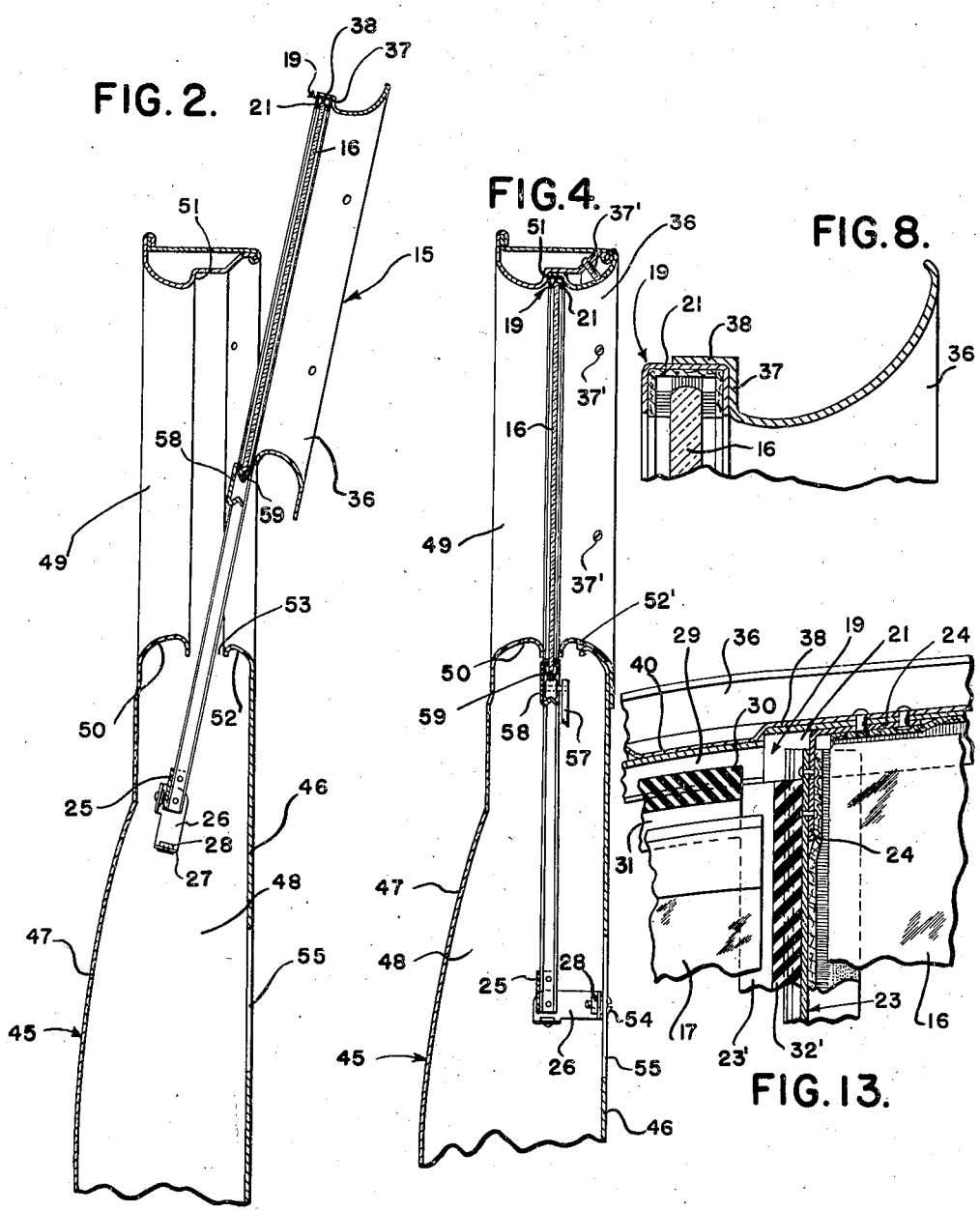

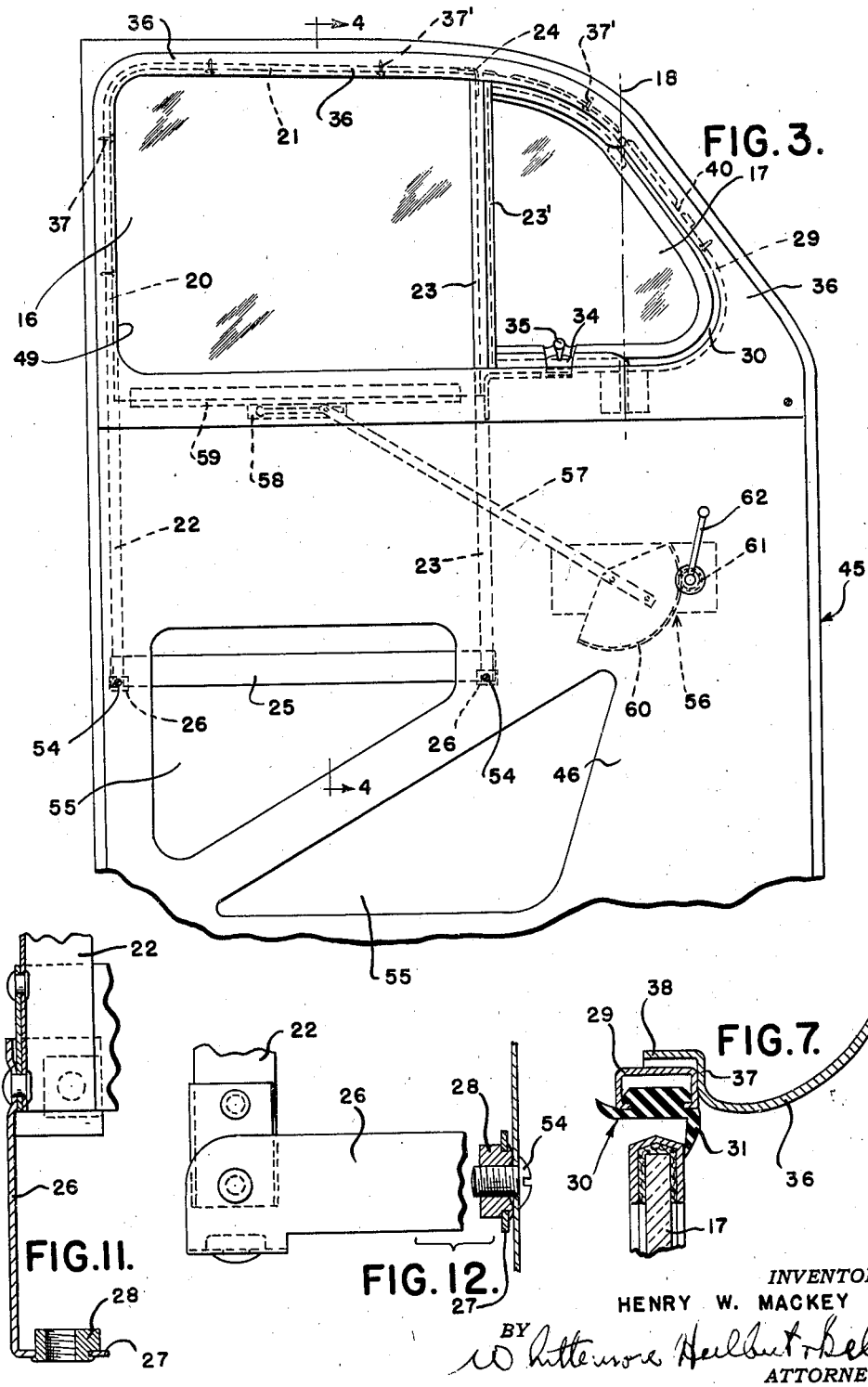

Patented Nov. 11, 1941

2,262,644

UNITED STATES PATENT OFFICE 2,262,644

WINDOW ASSEMBLY

Henry W. Mackey, Detroit, Mich., assignor to Motor Products Corporation, Detroit, Mich., a corporation of New York Application March 11, 1940, Serial No. 323,455

9 Claims. (Cl. 296—44)

This invention relates generally to vehicle bodies and refers more particularly to an improved window assembly for installation in vehicle bodies.

One of the principal objects of this invention resides in the provision of a window assembly capable of being installed as a unit in a vehicle body and comprising a vertically slidable closure panel, guide means slidably engageable with the opposite vertical edges of the closure panel and extending below the bottom edge of the closure panel a sufficient distance to effectively guide the panel throughout its vertical travel, and a garnish molding frame forming a part of the assembly. As a result of this feature, the several parts of the window assembly may be completely assembled separately from the body and may be readily installed in the body assembly at any convenient point. In the case of a vehicle body door, for example, the door may be completely assembled at a plant remote from the plant in which the window unit is assembled and the latter unit may be quickly installed in the door at either of the two plants or at still another plant.

Another object of this invention resides in the provision of a window assembly having the several parts previously set forth so constructed and arranged as to permit the portions of the guide means extending below the vertically slidable panel to be inserted into the window well, formed in the vehicle body below the window opening, through the slot usually provided at the top of the window well.

Still another object of this invention resides in the provision of a window assembly having an attaching bracket pivotally mounted at the lower end of the window assembly for swinging movement from a position in substantially the plane of the guide means for the vertically slidable panel to a position substantially perpendicular to this plane and having provision on the swinging end thereof for attachment to one of the body panels. Prior to installation of the window assembly in the window well of the vehicle body, the attaching bracket is swung to a position in substantially the plane of the guide means so as not to interfere with insertion of the guide means through the slot in the top of the well and is swung at right angles to the latter position after assembly to locate the free end adjacent one of the body panels for attachment thereto.

A further object of this invention resides in the provision of a window assembly having a pivoted ventilator panel, in addition to the parts previously mentioned, and installed in the vehicle body as a unit with the latter parts.

The foregoing, as well as other objects, will be made more apparent as this description proceeds, especially when considered in connection with the accompanying drawings, wherein:

Figure 1 is an elevation of the outer side of a window assembly constructed in accordance with this invention;

Figure 2 is a semi-diagrammatic vertical sectional view through a door of a vehicle body illustrating the manner in which the window assembly is installed in the door;

Figure 3 is an elevational view of the inner side of the door showing the window assembly in place;

Figure 4 is a sectional view taken substantially on the plane indicated by the line 4—4 of Figure 3;

Figures 5, 6, 7, 8, 9 and 10 are sectional views taken respectively on the lines 5—5, 6—6, 7—7, 8—8, 9—9 and 10—10 of Figure 1;

Figure 11 is a fragmentary sectional view illustrating the means for attaching the window assembly to the door;

Figure 12 is a fragmentary sectional view showing the attaching means in operative position;

Figure 13 is an enlarged sectional view of a part of the window assembly shown in Figure 1.

In Figure 1 of the drawings, I have illustrated a window assembly 15 comprising a vertically slidable closure panel 16 and a ventilator panel 17 mounted forwardly of the panel 16 for swinging movement about a vertical axis 18 located intermediate the front and rear edges of the pivoted panel. In accordance with conventional practice, the portion of the ventilator 17 in advance of the axis 18 swings inwardly to provide an intake opening for air and the portion in rear of the axis 18 swings outwardly to provide an outlet opening for the air in the vehicle body.

In addition, the window assembly 15 comprises a frame 19 substantially channel-shaped in cross section having a vertical portion 20 engageable with a portion of the rear edge of the panel 16 to form a guide for the latter and having a forwardly extending horizontal portion 21 adapted to receive the top edge of the panel 16 when the latter is in its uppermost position. The lower end of the portion 20 is welded or otherwise suitably secured to the upper end of a vertical frame member 22 forming an extension of the portion 20. The frame member 22 is also substantially channel-shaped in cross section for slidably engaging the rear edge of the vertically slidable panel 16 and has a length sufficient to guide the rear edge of the panel 16 during its travel from the closed position shown in Figure 1 to a position within the window well of the vehicle body to be more fully hereinafter described. Upon reference to Figure 13, it will be noted that the forward end of the portion 21 of the frame 19 terminates adjacent the front edge of the panel 16 and is secured to the upper end of a vertical frame bar 23 by means of a bracket 24. The vertical frame bar 23 is substantially channel-shaped in cross section and slidably engages the front edge of the vertically slidable panel.

The lower ends of the frame members 22 and 23 are maintained in proper spaced relationship by means of a cross brace 25 having the opposite ends respectively secured to the frame members 22 and 23. Mounted on each end of the cross brace 25 is an attaching bracket 26 having one end pivotally connected to opposite ends of the brace 25 to permit the brackets to be swung from the vertical positions shown in Figures 1, 2 and 11 to the operative positions shown in Figures 4 and 12. Referring particularly to Figures 11 and 12, it will be noted that the free ends of the attaching brackets are provided with laterally extending flanges 27 and a threaded collar 28 is suitably secured to each of the flanges 27 in order to permit attaching the brackets to the body structure in a manner to be presently set forth.

Referring again to Figure 1 of the drawings, it will be noted that the swinging ventilator 17 is provided with a frame 29 channel-shaped in cross section and adapted to retain a weather strip 30 for the ventilator. In accordance with conventional practice, the weather strip 30 has a portion 31 engageable with the inner side of the portion of the ventilating panel adapted to swing outwardly and has another portion (not shown) engageable with the outer side of the portion of the ventilator adapted to swing inwardly. The space between the rear edge of the ventilator 17 and the vertical frame bar 23 is sealed in the closed position of the ventilator by means of a sealing strip 32' secured to the base of the channel-shaped frame bar 23 and having a flexible forwardly extending lip 23' adapted to abut the inner side of the ventilator adjacent the rear edge of the latter.

Upon reference to Figures 1 and 13, it will be noted that the rear end of the top section of the frame 29 is attached to the forward end of the portion 21 of the frame 19 and the rear end of the bottom section of the frame 29 is secured to the vertical frame bar 23 by means of a bracket 33. Upon reference to Figure 6, it will be noted that a keeper 34 is secured to the bottom section of the frame 29 adjacent the rear edge of the ventilator 17 and this keeper cooperates with a suitable latch member 35 for securing the ventilator in its closed position.

In addition, the window assembly 15 comprises a finish or garnish molding frame 36 secured to the frame 19. Upon reference to Figure 8, it will be noted that the garnish molding frame 36 is provided with a vertical flange 37 at the outer edge adapted to abut the inner side of the frame 19 and terminating in a laterally outwardly projecting flange 38 overlapping the base of the channel-shaped frame 19. The lateral flange 38 on the garnish molding is welded or otherwise fixed to the frame 19 and forms a unit with the window assembly.

Referring again to Figures 1, 7 and 13, it will be noted that the channel of the frame 29 for the ventilator is not as deep as the channel of the frame 19 and, for this reason, the flange 38 on the garnish molding frame is depressed at spaced points to provide portions 40 for engaging the base of the channel-shaped frame 29. The portions 40 are preferably spot-welded or otherwise permanently secured to the frame 29 and serves to secure the frame 29 to the frame 19. The portion of the garnish molding frame extending along the bottom of the ventilator 17 is secured to the frame 29 by means of a clip 41, shown in Figure 6 as secured to the frame 29 and as having a shoulder 44 engageable with an inturned flange 42 on the adjacent portion of the garnish molding frame to maintain the latter in position against the frame 29. It will also be noted from Figure 6 that the clip 41 is provided with a tapered portion 43 cooperating with the portion 42 on the garnish molding to guide the latter portion into abutting engagement with the outer side of the shoulder 44 on the clip. During assembly, the garnish molding frame is first assembled with the clip 41 and is then in effect fulcrumed about the clip to its final position shown in Figure 6.

Upon reference to Figure 9, it will be noted that the inner flange at the upper end of the channel-shaped frame member 22 is removed and the flange 38 on the garnish molding frame is secured between the base of the channel-shaped portion 20 of the frame 19 and the base of the frame member 22. In the plane of the section shown in Figure 10, the flange 38 on the garnish molding frame is omitted and the vertical flange 37 on the frame merely abuts the inner flange of the channel-shaped portion 20 of the frame 19.

The window assembly, previously described, is installed in the vehicle body as a unit. In the present instance, the window assembly 15 is installed in a vehicle body door, designated generally in Figures 2 to 4, inclusive, by the reference character 45. The door 45 is of conventional construction having inner and outer panels 46 and 47 secured together in lateral spaced relation to form a well 48 below the window opening 49 in the door. The outer door panel 47 is provided with an inwardly extending flange 50 surrounding the window opening 49 and terminating in a vertical flange forming a shoulder 51. The inner door panel 46 is formed with an outwardly extending flange 52 around the window opening and the free edge of this flange is spaced from the free edge of the flange 50 providing a slot 53 along the lower side of the window opening. The width of the slot 53 is predetermined to permit the insertion of the frame members 22 and 23 into the window well 48. When installing the window assembly 15 in the door, the assembly is supported in a plane inclined inwardly with respect to the plane of the door in the manner shown in Figure 2 of the drawings, and the attaching brackets 26 are swung to their extended positions so as to occupy the minimum distance transversely of the assembly. The window assembly is then merely slid downwardly until the guide or frame members 22 and 23 assume positions in the well 48 whereupon the assembly is merely shifted laterally outwardly to locate the parts of the assembly in the relative positions thereof shown in Figure 4. When the window assembly has been properly installed in the door, the attaching brackets 26 are swung inwardly and secured to the inner door panel by means of the screws 54. In this connection, it will be noted that the attaching brackets are accessible for manipulation through the cut away portions 55 in the inner door panel. The upper portions of the window assembly may then be clamped against the shoulder 51 by securing the garnish molding frame 36 to the surrounding door structure by the fastener elements 37'.

The vertically slidable glass panel 16 is operated by a window regulator 56 of conventional construction. This window regulator is suitably secured to the inner door panel to one side of the path of travel of the panel 16 and comprises an operating arm 57. The free end of the arm 57 has a removable slot and pin connection with a bracket 58 secured to the usual glass retaining channel 59 which, in turn, is permanently secured to the lower edge of the panel 16. The opposite end of the operating arm 57 is secured to a gear segment 60 supported in any suitable manner for rotation and adapted to mesh with a pinion 61 operatively connected to a suitable operating handle 62. In order to assemble the free end of the operating arm 57 with the vertically slidable panel 16, the latter is lowered into the window well to a position wherein the bracket 58 is accessible through the uppermost cutaway portion 55 in the inner door panel 46. The window regulator mechanism is then operated to move the free end of the arm to its lowermost position whereupon the latter may be readily assembled with the bracket 58.

Thus, from the foregoing, it will be observed that I have provided a complete window assembly capable of being installed in the vehicle body as a unit after the body is assembled. This feature is decidedly advantageous in that it divorces the manufacture of the window assembly unit from the manufacture of the body and permits the two to be readily joined at any convenient point.

What I claim as my invention is:

1. A window assembly for a vehicle body capable of being installed in the body as a unit and comprising a vertically slidable closure panel, a pivoted panel supported in advance of the vertically slidable panel, a frame for the vertically slidable panel having inwardly opening vertically extending channel-shaped guides slidably engaging the opposite vertical edges of the slidable panel and extending for a substantial distance below the slidable panel in its closed position to guide the slidable panel throughout its vertical travel, said frame having a downwardly opening channel-shaped portion connecting the upper ends of the vertical guides and adapted to receive the upper edge of the vertically slidable panel in the closed position of the latter, a frame for the pivoted panel extending around the top, front, and bottom edges of said panel, and a garnish molding frame having portions secured to both of said frames to form a unit with the window assembly and to assist in securing the pivoted panel frame to the frame for the vertically slidable closure panel.

2. A window assembly for vehicle bodies having a window opening and having a well below the window opening provided with a slot extending along the bottom edge of the window opening, said window assembly comprising a vertically slidable closure panel movable from a position in the window opening to a position in the well through said slot, a frame for the vertically slidable panel having inwardly opening vertically extending channel-shaped guides slidably engaging the opposite vertical edges of the panel and extending into the well for guiding the panel throughout its vertical travel, said frame having a downwardly opening channel-shaped portion connecting the upper ends of the vetrical guides and adapted to receive the upper edge of the slidable panel when in its closed position, the width of said slot at the bottom of the window opening being sufficient to permit the guides to be inserted into the well through the slot by lowering the assembly in a plane inclined slightly from the vertical plane of the window opening, an attaching bracket hingedly supported at the bottom of the window assembly and movable from a position substantially in the plane of the vertical guides to a position substantially perpendicular to said plane, said attaching bracket being accessible for manipulation through an opening in the vehicle body structure, and means for securing the bracket to the body structure.

3. A window assembly for vehicle bodies having inner and outer panels formed with a window opening in the upper portions and spaced laterally from each other below the window opening to form a well communicating with the window opening through a slot extending along the bottom edge of the window opening, said window assembly comprising a vertically slidable closure panel movable through said slot, a frame for the closure panel having inwardly opening channel-shaped vertical guides slidably engaging the opposite vertical edges of the closure panel to guide the same throughout its vertical travel and having a downwardly opening channel-shaped portion connecting the upper ends of the guides and adapted to receive the top edge of the closure panel when the latter is in its closed position, the width of the slot extending along the bottom edge of the window opening being sufficient to permit inserting the lower end portion of the guides through the slot into the well, a garnish molding frame secured to the guides and downwardly opening channel-shaped portion of the frame in a manner to form a unit with said frame, means for securing the garnish molding frame to the portions of the body panels surrounding the window opening, and means accessible through an opening in the inner body panel for securing the lower ends of the guides to one of the body panels.

4. A window assembly for vehicle bodies having inner and outer panels formed with a window opening in the upper portions and spaced laterally from each other below the window opening to form a well communicating with the window opening through a slot extending along the bottom edge of the window opening, said window assembly adapted to be installed in the body as a unit and comprising a vertically slidable closure panel having provision at the bottom edge for detachably engaging a part of a window regulator mechanism, a frame for the closure panel having inwardly opening vertically extending channel-shaped guides slidably engaging the opposite vertical edges of the panel and extending into the well for guiding the panel throughout its vertical travel, said frame further having a downwardly opening channel-shaped portion connecting the upper ends of the vertical guides and adapted to receive the upper edge of the slidable panel when in its closed position, a garnish molding frame having portions secured to the vertical guides and to the channel-shaped portion of the frame connecting the upper ends of the vertical guides in a manner to form a unit with the frame, the width of said slot at the bottom of the window opening being sufficient to permit the lower end portions of the guides to be inserted into the well through the slot by lowering the window assembly in a plane slightly inclined to the vertical plane of the window opening, a regulator mechanism located in said well and carried by one of the body panels, said regulator mechanism having a part attachable to the lower edge of the slidable panel during installation of the window assembly, means for securing the garnish molding frame to the portions of the body panels surrounding the window opening, and means accessible through an opening in the inner body panel for securing the lower ends of the guides to one of the body panels.

5. A window assembly for vehicle bodies having inner and outer panels formed with a window opening in the upper portions and spaced laterally from each other below the window opening to form a well communicating with the window opening through a slot extending along the bottom edge of the window opening, said window assembly comprising a vertically slidable closure panel movable through the slot, a pivoted panel positioned in the window opening in advance of the vertically slidable panel and cooperating with the latter to close the window opening, guide means engageable with opposite vertical edges of the vertically slidable panel and extending into the well, said guide means being secured together to form a unit with the window assembly, means for mounting the pivoted panel on the guide means whereby the pivoted panel forms a unit with the window assembly, the width of said slot at the bottom of the window opening being sufficient to permit the guides to be inserted through the slot into the window well, and means accessible through an opening in the inner body panel for securing the lower ends of the guide means to one of said body panels.

6. A window assembly for vehicle bodies having inner and outer panels formed with a window opening in the upper portions and spaced laterally from each other below the window opening to form a well communicating with the window opening through a slot extending along the bottom edge of the window opening, said window assembly adapted to be installed as a unit in the vehicle body and comprising, a vertically slidable closure panel movable through the slot aforesaid, a pivoted panel located in the window opening in advance of the vertically slidable panel, a frame for the vertically slidable panel having inwardly opening vertically extending channel-shaped guides slidably engaging the opposite vertical edges of the slidable panel and extending for a substantial distance into the window well, means for securing the pivoted panel to said frame, a garnish molding frame extending around the window opening and secured to the frame to form a unit with the window assembly, said slot having a width sufficient to permit the lower end portions of the guides to be inserted into the well through the slot by lowering the assembly in a plane inclined slightly to the vertical plane of the window opening, means for securing the garnish molding frame to the portions of the body panels surrounding the window opening, and means accessible through an opening in the inner body panel for securing the lower ends of the guides to one of the body panels.

7. A window assembly for vehicle bodies having inner and outer panels formed with a window opening in the upper portions and spaced laterally from each other below the window opening to form a well communicating with the window opening through a slot extending along the bottom edge of the window opening, said window assembly adapted to be inserted as a unit into the vehicle body and comprising, a vertically slidable closure panel movable through the slot, a pivoted panel in advance of the vertically slidable closure panel, a frame for the slidable panel having inwardly opening vertically extending channel-shaped guides slidably engaging the opposite vertical edges of the panel and extending for a substantial distance into the window well, said frame having a downwardly opening channel-shaped portion connecting the upper ends of the vertical guides and adapted to receive the upper edge of the slidable panel in its closed position, a frame extending around the top, front and bottom edges of the pivoted panel and secured to the frame for the slidable panel, a garnish molding frame extending around the window opening and secured to both of the frames aforesaid to form a unit with the window assembly, the width of said slot at the bottom of the window opening being sufficient to permit the lower end portions of the vertical guides to be inserted through the slot into the window well, means for securing the garnish molding frame to the upper portions of the body panels surrounding the window opening, and means accessible through an opening in the inner body panel for securing the lower ends of the vertical guides to one of the body panels.

8. A window assembly for vehicle bodies having inner and outer panels formed with a window opening in the upper portions and spaced laterally from each other below the window opening to form a well communicating with the window opening through a slot extending along the bottom edge of the window opening, said window assembly adapted to be installed as a unit in the window opening and comprising, a vertically slidable closure panel movable through said slot, guide means slidably engageable with the vertical edges of the closure panel and extending into the window well to guide said closure panel, said guide means being secured together to form a unit with the window assembly, the width of said slot at the bottom of the window opening being sufficient to permit the guides to be inserted into the well through the slot by lowering the window assembly in a plane inclined to the vertical plane of the window opening, an attaching bracket supported by the guide means at the lower end of the latter for swinging movement from a position in substantially the plane of the guide means to an attaching position substantially perpendicular to the plane of the guide means, and means accessible through an opening in the inner body panel for securing the attaching bracket to one of the body panels.

9. A window assembly for vehicle bodies having inner and outer panels formed with a window opening in the upper portions and spaced laterally from each other below the window opening to form a well communicating with the window opening through a slot extending along the bottom edge of the window opening, said window assembly adapted to be installed as a unit in the vehicle body and comprising, a vertically slidable closure panel, a frame for the closure panel having inwardly opening channel-shaped guides slidably engaging the vertical edges of the panel and extending into the window well, said frame having a downwardly opening channel-shaped portion connecting the upper ends of the guides and adapted to receive the upper edge of the closure panel when the latter is in its raised position, the width of the slot at the bottom of the window opening being sufficient to permit the guides to be inserted through the slot into the window well, attaching brackets pivotally supported at the lower ends of the guides for swinging movement from a position in substantially the plane of the vertical guides to an attaching position substantially perpendicular to the plane of the vertical guides, and means accessible through openings in the inner body panel for attaching the brackets to said inner body panel.

HENRY W. MACKEY.